(12) United States Patent
Chaudhuri et al.

(10) Patent No.: US 7,299,220 B2
(45) Date of Patent: Nov. 20, 2007

(54) CONSTRUCTING DATABASE OBJECT WORKLOAD SUMMARIES

(75) Inventors: Surajit Chaudhuri, Redmond, WA (US); Vivek Narasayya, Redmond, WA (US); Prasanna Ganesan, Menlo Park, CA (US)

(73) Assignee: Microsoft Corporation, Redmond, WA (US)

( * ) Notice: Subject to any disclaimer, the term of this patent is extended or adjusted under 35 U.S.C. 154(b) by 519 days.

(21) Appl. No.: 10/815,061

(22) Filed: Mar. 31, 2004

(65) Prior Publication Data

US 2005/0223026 A1    Oct. 6, 2005

(51) Int. Cl.
    *G06F 17/30* (2006.01)
(52) U.S. Cl. .................................. 707/2; 707/4; 707/5
(58) Field of Classification Search ...................... None
    See application file for complete search history.

(56) References Cited

U.S. PATENT DOCUMENTS

| | | | |
|---|---|---|---|
| 5,960,423 A * | 9/1999 | Chaudhuri et al. | 707/2 |
| 6,223,171 B1 * | 4/2001 | Chaudhuri et al. | 707/2 |
| 6,598,038 B1 * | 7/2003 | Guay et al. | 707/2 |
| 7,120,623 B2 * | 10/2006 | Ganesan et al. | 707/2 |
| 2005/0192978 A1 * | 9/2005 | Lightstone et al. | 707/100 |

OTHER PUBLICATIONS

Index Filtering and View Materialization in ROLAP Environment By Shi Guang Qiu et al, Nov. 5-10, 2001, Atlanta, Georgia, USA. Copyright 2001 ACM I-581 13-436-Mar. 1, 2001.*

Aboulnaga, A. and Chaudhuri, S. Self-Tuning Histograms: Building Histograms Without Looking at Data, Processings of ACM SIGMOD, Philadelphia, 1999.

Acharya S., Gibbons P.B., and Poosala V. Congressional Samples for Approximate Answering of Group-By Queries, Proceedings of ACM SIGMOD, 2000.

Agrawal, S., Chaudhuri, S., and Narasayya, V. Automated Selection of Materialized Views and Indexes for SQL Databases, Proceedings of VLDB 2000.

Agrawal S., Chaudhuri S., Kollar L., and Narasayya V. Index Tuning Wizard for Microsoft SQL Server 2000, Aug. 2000.

Borzsonyi S, Stocker K., Kossmann D. The Skyline Operator, Proceedings of ICDE 2001.

Calzarossa M., and Serazzi G. Workload Characterization: A Survey, Proceedings of IEEE, 81(8), Aug. 1993.

Chandra, A. K., Hirschberg, D. S., and Wong, C. K. Approximate Algorithms For Some Generalized Knapsack Problems, Theoretical Computer, Science, 3, 293-304, 1976.

Chatziantoniou D. and Ross, K. A. Groupwise Processing of Relational Queries, Proceedings of VLDB 1997.

Chaudhuri S., Das G., Datar M., Motwani R., and Narasayya V. Overcoming Limitations of Sampling for Aggregation Queries, Proceedings of ICDE 2001.

(Continued)

*Primary Examiner*—Khanh B. Pham (57) ABSTRACT

A database object summarization tool is provided that selects a subset of database objects subject to filtering constraints such as a partial order or optimization of some attribute. A dominance primitive filters out tuples that are dominated according to a partial order constraint by another tuple. A representation primitive selects a representative subset of tuples such than an optimization criteria is met.

67 Claims, 7 Drawing Sheets

OTHER PUBLICATIONS

Chaudhuri S., Das G., and Narasayya V. A Robust, Optimization-Based Approach for Approximate Answering of Aggregate Queries, Proceedings of ACM SIGMOD 2001.

Chaudhuri S., Gupta A, and Narasayya V. Compressing SQL Workloads (Workload Compression), Proceedings of ACM SIGMOD 2002.

Chaudhuri S., Kaushiki R., and Naughton J.F. on Relational Support for XML Publishing: Beyond Sorting and Tagging, Proceedings of ACM SIGMOD 2003.

Chaudhuri S., and Narasayya, V. AutoAdmin "What-If" Index Analysis Utility, Proceedings of SIGMOD 1998.

Elnaffar S. A Methodology for Auto-Recognizing DBMS Workloads, Proceedings of CASCON'02, 2002.

Elnaffar S., Martin P., and Horman R. Automatically Classifying Database Workloads, In Proceedings of CIKM'02, 2002.

Fagin R. Combining fuzzy information from multiple systems, Proceedings of ACM PODS 1996.

Fagin R. Fuzzy Queries in Multimedia Database Systems, Proceedings of ACM PODS 1998.

Ganti V., Lee M.L., and Ramakrishnan R. ICICLES: Self-tuning Samples for Approximate Query Answering, Proceedings of VLDB 2000.

Johnson, D.S. Approximation Algorithms for Combinatorial Problems, Journal of Computer and System Sciences, 9, 1974, pp. 256-278.

Legaria, C.G., and Joshi, M. M. Orthogonal Optimization of Subqueries and Aggregation. Proceedings of SIGMOD 2001.

Lovasz, L. "On the ratio of optimal integral and fractional covers", Journal: Discrete mathematics, vol. 13, 1975, pp. 383-390.

Papadias D., Tao Y., Fu G., Seeger B.: An Optimal and Progressive Algorithm for Skyline Queries. Proceedings of ACM SIGMOD 2003.

Srinivasan, A. Improved Approximations of Packing and Covering Problems. Proc. 27th Ann. ACM Symposium. on Theory of Comp., pp. 278-276, 1995.

Stillger M., Lohman C., and Markl V. LEO-DB2's Learning Optimizer. In Proceedings of VLDB 2001, 2001.

Tan K., Eng P., Ooi B.C.: Efficient Progressive Skyline Computation. Proceedings of VLDB 2001, 2001.

Valentin, G., Zuliani, M., Zilio, D., and Lohman, G. DB2 Advisor: An Optimizer Smart Enough to Recommend Its Own Indexes. Proceedings of ICDE 2000, 200.

Yu P., Chen M., Heiss H., and Lee S. On Workload Characterization of Relational Database Enviorments. IEEE Transactions of Software Engineering, vol. 18, Apr. '92, 1992.

ILOG CPLEX: CPLEX algorithms, retrieved from the Internet on Feb. 21, 2005.

* cited by examiner

Fig.1

| ATTRIBUTE | TYPE | MEANING |
|---|---|---|
| StmtType | Atomic | Statement type: (SELECT, UPDATE, INSERT, DELETE) |
| SQLString | Atomic | SQL String of statement |
| Timestamp | Datetime | Time when statement was executed |
| User | Atomic | Name/Id of user issuing statement |
| Application | Atomic | Name of application issuing statement |
| Weight | Atomic | A number representing the importance of this statement in the workload |
| FromTables | Set | Set of tables referenced in FROM clause |
| WhereCols | Set | Set of columns referenced in WHERE clause |
| JoinConds | Set | Set of join conditions in statement |
| GroupByCols | Set | Set of columns in GROUP BY clause |
| OrderByCols | Sequence | Set of columns in ORDER BY clause |
| ProjCols | Set | Set of columns projected in query |
| EstimatedCost | Atomic | Optimizer estimate of query cost from plan |
| ExecutionCost | Atomic | Elapsed time executing statement |
| CPUTime | Atomic | CPU time executing statement |
| IOTime | Atomic | I/O time executing statement |
| Memory | Atomic | Max memory consumed during statement execution |
| IndexesUsed | Set | Set of indexes used in answering statement |

CONSTRUCTING DATABASE OBJECT WORKLOAD SUMMARIES

TECHNICAL FIELD

The invention pertains generally to the field of database management and more particularly to operators for use in constructing a summary of database statements or objects.

BACKGROUND OF THE INVENTION

The past few years have seen the emergence of a large class of tasks that benefit from analysis of SQL workload information. Some examples of such tasks are database administration and understanding user/application behavior. The problem of collecting a SQL workload is facilitated by profiling tools provided by commercial database vendors that log SQL activity on the server over a representative period of time. However, little attention has been paid to understanding the requirements for analysis of the collected workload.

In analyzing workloads, it is helpful to identify a small representative subset that captures the essence of the large workload that has been logged using automated tools. There are multiple reasons why picking such a small representative subset is necessary. First, the resources needed to accomplish tasks such as index tuning grows with increasing sizes of workloads. There is a significant benefit to be gained by "filtering" the workload before it is fed to these tasks, while not compromising its characteristics. A second motivation for identifying a small representative subset is the necessity of having to meaningfully summarize data for viewing by DBAs or analysts. It is important to be able to offer relatively small representative synopses of the workload, before "drilling down" to identify the queries of interest.

A simple way to obtain a representative subset is to pick a uniform random sample of the workload. While sampling is conceptually simple, and, in fact, useful in many situations, a DBA may like to obtain a representative subset that has additional constraints, e.g., pick a representative workload with the 100 most expensive queries while ensuring that every table in the database occurs in at least 5 queries. Thus, the specification for picking a representative subset for a workload (henceforth called a "summary") depends on the task at hand and, more often than not, sampling in itself is not adequate.

Recently, several tools have emerged that exploit knowledge of the database workload for a variety of tasks such as physical design tuning, feedback based optimization, and approximate query processing. There has also been work on classifying database workloads, such as OLTP vs DSS, so as to enable automatic tuning and configuration of database system parameters based on workload type. Typically, workloads collected by today's database profiling tools can be very large (millions of statements), whereas most of the above tools work efficiently for relatively small workload sizes.

The concept of workload compression has been introduced to find a smaller workload whose use results in the same application quality as when the original workload is used. Workload compression requires applications to specify custom distance functions that quantify how close two statements in the workload are. Providing such distance functions may not be easy for all applications. REDWAR allows simple aggregations over the structure and complexity of SQL statements and transaction run-time behavior. A variety of techniques for producing a workload model have also been presented. However, the "representativeness" of these workload models varies.

SUMMARY

A database object summarization tool is provided that selects a subset of database objects subject to constraints such as a partial order or optimization of some aggregate over one or more attributes. The subset is a summary of the database objects that can be useful for better understanding the database without the need for examining the entire set of database objects.

The object selection criterion can be a partial order criterion for an attribute, such one or more transitive inequality conditions, whereby a master database object dominates an associated slave database object. An operator with this type of object selection criterion can include a dominance aggregation module that, for a master database object, aggregates information about slave database objects that the master database object dominates.

The object selection criterion can be an optimization criterion that is an aggregate over a database object attribute. The optimization criterion can be the minimization or maximization of an aggregate over one or more attributes. A global constraint can be input to the operator on the attributes of the database objects in the subset. A local constraint be input on the attributes of the database objects in the subset for each partition. A filter constraint can be imposed with respect to any database object in the subset. In one embodiment, the operator includes a database object ranking module that specifies an order, based on attribute values, in which database objects are accessed by the operator for possible selection to the subset.

The database objects can be database statements from a database workload presented according to a workload schema. The partitioning module can hash database objects on the partitioning attribute.

DETAILED DESCRIPTION

A natural approach to summarizing workload information is to express the specification for a summary workload as a SQL statement over the entire workload represented in a relational database. However, today's SQL provides limited support for conveniently specifying such summary workloads. Two primitive operators will be described herein that support workload analysis. As with traditional filtering, both these primitives take as input a set of statements and output a subset of those statements. The first primitive, "dominance", allows filtering based on a partial order among the statements in the workload. Thus, statements that are "dominated" by other statements in the workload (as determined by the partial order) are filtered out. For example, when considering workload summarization for the index-selection task, whenever two queries $Q_1$ and $Q_2$ are identical in all respects except in their GROUP BY clause, and if $Q_1$ contains a superset of the GROUP BY columns of $Q_2$, it could be determined that $Q_1$ dominates $Q_2$ since the indexes chosen for $Q_1$ are likely to be adequate for $Q_2$ as well.

The second primitive, called "representation", is a form of combinatorial optimization. It allows specification of a subset of the workload such that a certain objective function ( any aggregate expression over an attribute) is maximized or minimized, subject to a set of constraints. For example, in the index selection task, it may be advantageous to constrain the output to no more than 1000 statements in the workload, while trying to maximize "coverage" (such as total execution time of all statements in the output) of the workload. It should also be noted that both the dominance and representation primitives need to be able to provide aggregate information as well. For example, the count of the total number statements a dominating statement in the workload has dominated would be advantageous.

The primitives of dominance and representation, while described herein in the context of workload summarization are useful in a variety of other scenarios. The dominance primitive is a generalization of the Skyline operator that has been proposed, but not yet included, in SQL and implementation of the dominance primitive can leverage algorithms that have been proposed for implementing the Skyline operator, as will be described in more detail below. Implementing the representation primitive in SQL requires consideration of trade-offs between functionality and complexity. While the representation primitive can potentially have wide usage, in its full generality requires solution of the Integer Programming problem that is known to be NP-hard. While several algorithms are known for solving the IP problem, their integration into SQL directly can result in a very heavyweight operator whose usefulness on large data sets may be rather limited. Thus, an alternative, simpler, implementation in SQL is described that allows efficient and scalable implementation. This simple extension appears to be adequate for many common summarization tasks.

Figure 1:
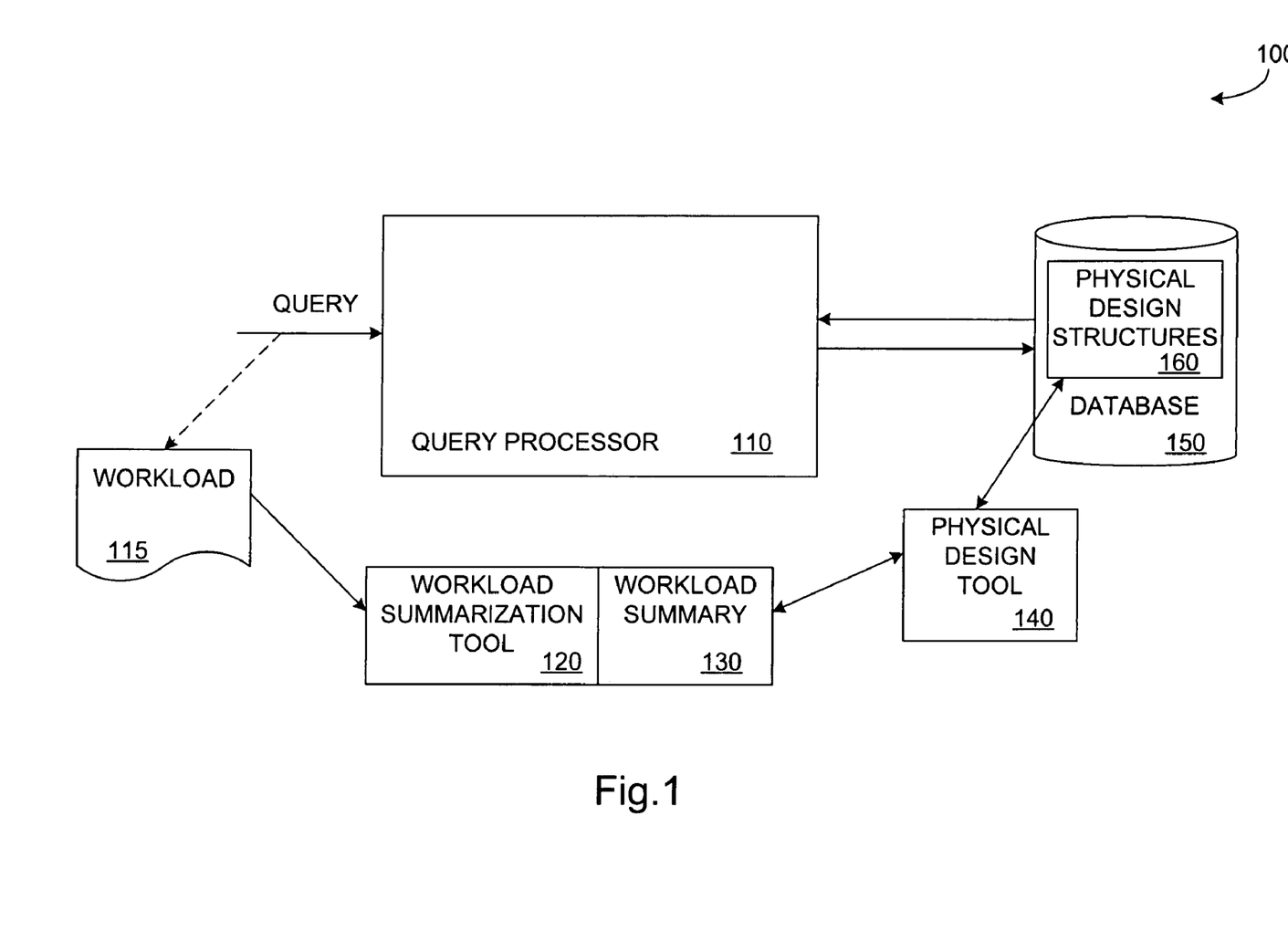
FIG. 1 is a functional block diagram of a query processing system that features a workload summarization tool constructed in accordance with an embodiment of the present invention.

FIG. 1 is a functional block diagram of a query processing system 100 that includes a workload summarization tool 120 that implements the primitive operators dominance and representation. Queries are presented to a query processor 110 for selecting a given set of tuples from a database 150 or to otherwise act upon the database 150, such as inserting or deleting tuples from the database. The query processor 110 takes advantage of a set of physical design structures 160, such as indexes and/or materialized views, to more efficiently locate tuples in the database.

Figure 2:
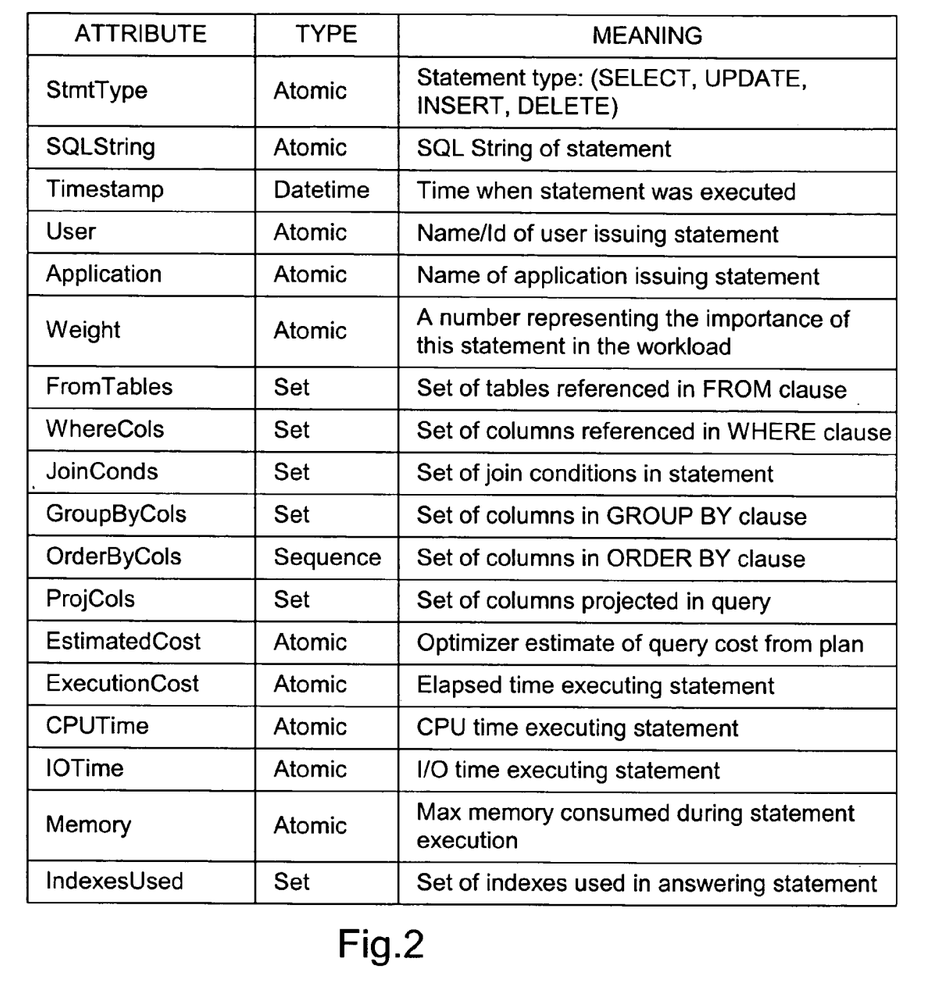
FIG. 2 is table representation of a workload schema that can be used in practice of an embodiment of the present invention.

The queries that are presented to the database are logged as the query processing system's workload 115. It is expected that the workload is stored according to a workload schema like the one depicted in FIG. 2. Each query statement is an object in the schema with one or more attributes corresponding to a property of the query statement. The schema shown in FIG. 2 contains attributes of the following types: (1) atomic valued attributes such as the execution cost of the statement or the number of tables referenced by the statement; (2) set-valued attributes such as the set of tables referenced by the query; and (3) sequence attributes such as the sequence of ORDER BY columns. According to the schema, the attributes of a statement in the workload are broadly categorized into three categories: (1) syntactice and structural statements that describe the syntax or structure of the statement; (2) plan information; and (3) execution information.

A workload summarization tool 120 inputs the set of queries in the workload which are expressed according to the workload schema to construct a subset of the queries that makes up a workload summary 130. The workload summary 130 is intended to include queries that in some way subsume or represent other queries in the workload which are not included in the workload summary. To select these queries, the workload summarization tool provides a set of operators to a user for acting upon the queries in the workload to select a satisfactory subset. One database component that could advantageously use the workload summary 130 is the physical design tool 140. The physical design tool 140 enumerates candidate physical design structures based on queries in the workload and can benefit from a workload summary as described below.

EXAMPLE 1

Workloads often consist of different templates that are invoked repeatedly with different parameters. Within each template, relationships between the queries can be leveraged to filter out some of the queries before inputting them to the physical design tool 140. For example, whenever two queries $Q_i$ and $Q_j$ are identical in all respects except their GROUP BY clause, and if $Q_i$.GroupBy Cols $\subset$ $Q_j$.GroupByCols and Qi. OrderByCols is a prefix of Qj. OrderByCols, $Q_i$ could be filtered from the workload prior to inputting it to the physical design tool 140, since indexes that are beneficial for Qj are likely to be adequate for Qi as well. After this filtering step, a summary workload could be selected such that each template receives adequate representation that is proportional to the number of statements in each template. Finally, the workload summary could be limited to nom more than 1000 queries such that the sum of the Weight attribute is maximized, i.e., as much of the total weight of the original workload as possible is captured.

EXAMPLE 2

Another application for workload summarization is in finding queries that are potential resource bottlenecks. Queries that are responsible for consuming the most CPU, I/O, or memory resources are often of interest to DBAs. It would be helpful then to find the smallest subset of queries that covers at least 50% of CPUTotal, IOTotal, and MemoryTotal.

EXAMPLE 3

Workload summarization can also be used to identify columns for potential building or updating of statistics. For this task, queries with a large discrepancy between the optimizer's estimated time and the actual execution time or having large errors in cardinality estimation are sought. Statements could be filtered out that do not have at least 50% error in cardinality estimation or take less than one second to execution. The remaining statements could be partitioned based on the tables referenced (FromTables attribute) and join conditions down the columns that could benefit from the creation/update of statistics by eliminating statements which have a super set of the columns involved in some other statement. Five or less statements could be selected per partition such that no more than a total of 100 statements in contained in the summary, while maximizing the total value of CostRatio (defined as ExecutionCost/EstimatedCost) over the statements in the summary.

A workload summarization tool 120 that can achieve the above objectives can be implemented with three primitive operators: filtering, dominance, and representation. Filtering is a traditional operator that eliminates any statement in the workload that does not satisfy a given Boolean Expression. An atomic condition in the filter is any predicate on an attribute of the workload schema. For example, the filtering operator can be used to filter out statements with low errors in cardinality estimation or with low execution times.

The dominance primitive can be used to specify a partial order among statements in the workload. Moreover, this partial order is used also as a filtering and aggregation operator (as will described below). In particular, for any pair of statements $S_1$ and $S_2$ in the workload, if per the partial order $S_1$ is "dominated by" $S_2$, then $S_1$ must be filtered from the output of the dominance operator, with the exception of the case when $S_1$ dominates $S_2$ and $S_2$ dominates $S_1$. In the latter case, $S_1$ and $S_2$ are considered equivalent, and it is acceptable to include either one (but not both) in the output. Thus, the semantics of dominance is that it outputs a smallest subset such that every statement not included in the output is dominated by some statement in the output.

The specification of the partial order, or equivalently the test for whether a statement is dominated by another statement, is expressed by a conjunction of conditions on the attributes of the statements. In general, some of the conditions will be strict equality conditions, and the rest will be partial order conditions. The attributes mentioned in the strict equality conditions are referred to as partitioning attributes associated with the dominance primitive. The strict equality conditions in the first example above are that FromTables, JoinConds, and WhereCols of both statements are identical, and the partial order conditions are: (1) GroupByCols of the first statement is a subset of GroupByCols of the second statement: (2) OrderByCols of the first statement is a prefix of OrderByCols of the second statement. The strict equality conditions imply a partitioning of the statements. Note also, that if in this example, two statements in the workload have the same group by and order by columns, then either of them (but not both) may be included in the output.

Figure 3:
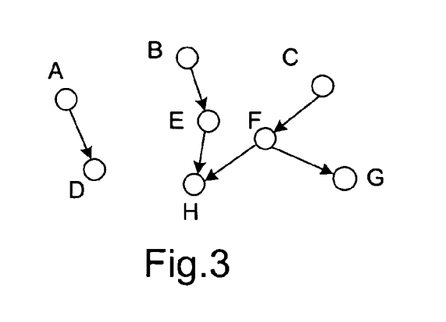
FIG. 3 is a graphical illustration of a dominance operator in accordance with an embodiment of the present invention.

The dominance relationship is illustrated graphically in FIG. 3. Each node in the graph denotes a statement and an edge from node X to node Y denotes that X dominates Y. In FIG. 3, the output set of statements is {A,B,C}. Dominance is advantageous for certain workload summarization tasks. For example, an index that is appropriate for statement $S_2$ may also be appropriate for $S_1$, but not necessarily the other way around. In the described embodiment of the dominance operator the comparison operators of the inequality conditions are restricted to transitive operators, such as $<$, $>$, $\geq$, and $\leq$ for atomic-valued attributes, $\subset$, $\supset$, $\subseteq$, and $\supseteq$ for set-valued attributes, and prefix-of, subsequence-of, and supersequence-of for sequence-valued attributes. In addition, for the described embodiment, an attribute of a statement must be compared with the same attribute of the other statements. Since the dominance relationship imposes a partial order, it is transitive. Transitivity is useful in enabling an efficient implementation of dominance.

As noted above, the dominance primitive also represents aggregation. With every statement S in the output of the dominance operator, aggregation information over the statements that were dominated by S could be included. Each such specified aggregate becomes a new attribute, which will be referred to as a dominance-based aggregate attribute of each statement output by the dominance primitive. A dominance-based aggregate attribute corresponding to an output statement S is the SUM or COUNT function (or, in principle, any other aggregate function) applied to any attribute, over all the statements that were eliminated by S, and including S itself. Note that such a statement can be dominated by two different statements, neither of which dominates the other. In FIG. 3 H is dominated by E and F, but neither E nor F dominates the other. One way to handle this case is to establish a convention that H's value will contribute to the aggregate of either E or F but not both.

Figure 7:
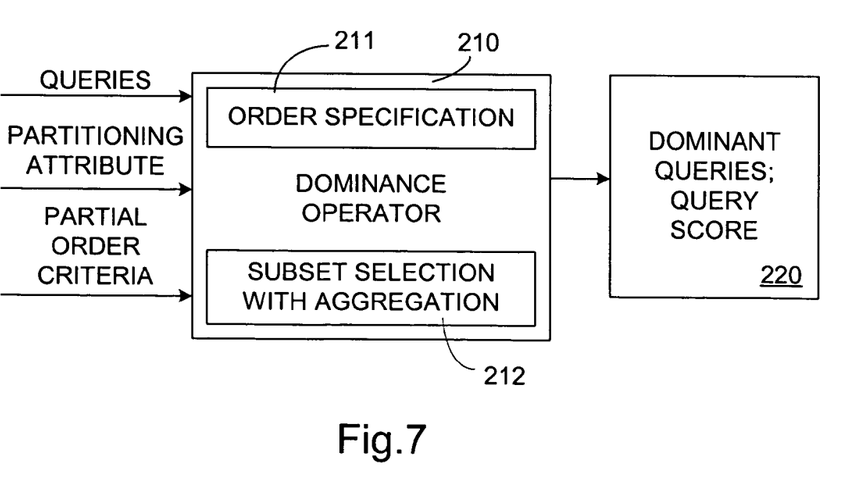
FIGS. 7-8 are block diagrams of dominance and representation operators, respectively according to an embodiment of the present invention.

FIG. 7 is a simple functional block diagram of the dominance operator. Workload queries, a partitioning attribute, and a partial order criteria are input to the dominance operator 210. The dominance operator includes a partial order specification module 211 that inputs the partial order criteria and a subset selection and aggregation module 212 selects queries that dominate other queries based on the partial order criteria and aggregates the values of statements that are eliminated by other statements and associates the aggregate value with each statement that passes to the output 220.

Figure 8:
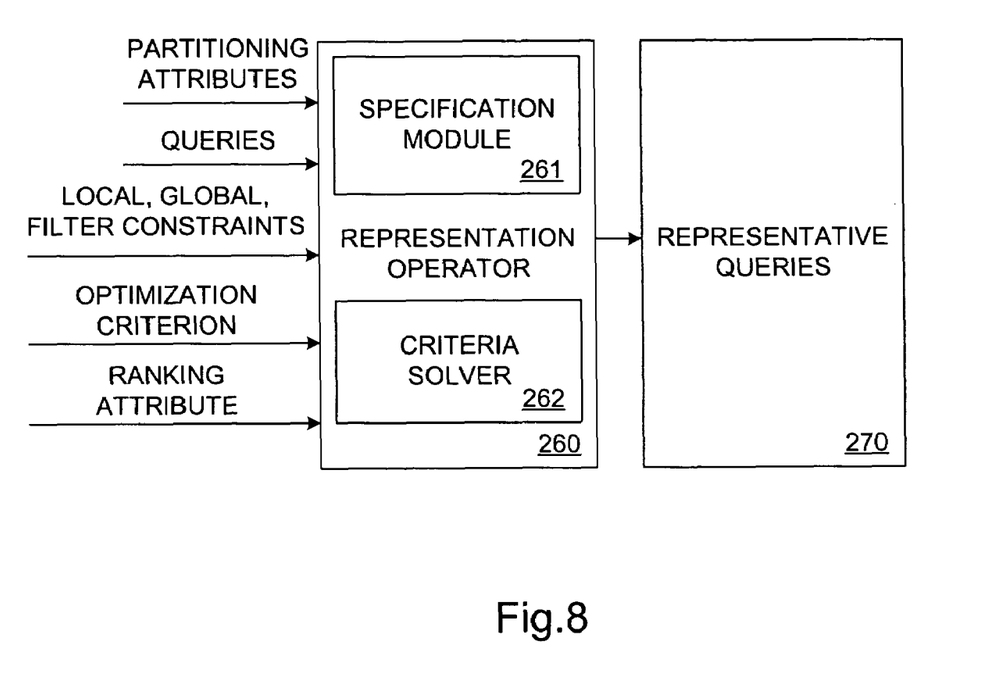

Referring now to FIG. 8, a block diagram of the representation primitive 260 is shown. The representation primitive allows specification to a specification module 261 of a subset of the workload such that a certain object function (an aggregate expression offer an attribute) is maximized or minimized, subject to a set of constraints. Thus, the representation primitive specifies an optimization problem. Criteria upon which representation can sort and filter queries, as described herein, include, as shown as input in FIG. 8 to the representation operator 260: (1) partitioning attributes; (2) optimization criterion; (3) global constraints; (4) local constraints; and (5) filtering constraints. A criteria solver 262 resolves those constraints and selects the subset of representative queries.

Representation can specify a partitioning of the input to be used, so that constraints can be specified at a per-partition level. Partitioning is similar to a GROUP BY, in that each partition corresponds to all statements that have the same values for all the partitioning attributes.

The optimization criteria can be specified in one of the following forms: (1) Minimize an aggregate over an attribute, e.g., the number of statements in the output, subject to the constraints; or (2) Maximize an aggregate over an attribute, e.g., maximize the sum of ExecutionCost subject to the constraints.

Global constraints are constraints on an aggregate computed over the entire output set of statements. Any condition expression involving aggregates over any of the attributes of the input can be used as a global constraint. Referring to the first example above, the requirement that the chosen statements should cover at least 75% of the total ExecutionCost of statements in the input workload is a global constraint.

Local constraints are identical to global constraints, except that the constraint applies to each individual partition. For example, it could be specified that every partition should contain enough output statements to cover at lest 75% of the total statements in that partition.

Filter constraints are constraints that apply to each individual statement chosen by the representation process. A statement not satisfying the filter constraint may not be a part of the output. A filter constraint may involve aggregate expressions computed over partitions for the entire input workload. For example, a filter constraint could require that every statement chosen has an execution cost at least 30% higher that the average execution cost for its partition.

A workload summarization tool can be implemented with an extension of SQL that allows a user to declaratively specify workload summarization tasks. The proposed extension of SQL is referred to herein as WAL (Workload Analysis Language). The overall structure of a query in WAL is shown below:

```
SELECT <select clause>
FROM <from clause>
WHERE <filter condition>
DOMINATE <dominate clause>
REPRESENT <representation clause>
```

The SELECT clause is similar to that of any SQL query. It permits the specification of a subset of the attributes in the workload schema, together with other aggregates. In addition, dominance-based aggregate attributes can be defined in this clause. Dominance-based aggregates are similar to aggregates computed for each group specified by the GROUP BY clause of a traditional SQL query. The difference is that, for each output statement S, the aggregate is computed over the set of all statements dominated by S. These aggregates are defined by prefixing DOM to the traditional keywords for computing aggregates. For example, DOMSUM(ExecutionCost) returns, for each statement S output by the dominance primitive, the sum of the ExecutionCost of all statements dominated by S, including S itself. Thus for each aggregate function (e.g., SUM, COUNT) in SQL, there is a corresponding dominance-based aggregate function. The scope of such an attribute is the block defined by the SELECT clause. Thus this attribute can be referenced in the REPRESENT clause in a constraint.

The FROM clause simply specifies a single table or view. In the context of workload summarization, it is implicit that this table or view conforms to the workload schema. The view may itself be an arbitrary SQL query whose result conforms to the workload schema. For example, traditional SQL operators such as UNION, DIFFERENCE etc., could be used to combine two or more workloads. In SQL, the WHERE clause is permitted to be an arbitrary Boolean condition applicable to each tuple of the table or view specified in the FROM clause.

The syntax of the DOMINATE clause is:

```
DOMINATE WITH (PARTITIONING BY <attr-list>) (SLAVE.Attr Op MASTER.Attr)
```

Thus, the strict equality dominance conditions are specified by the shorthand PARTITIONING BY (<attr-list>). This is followed by the conditions that define the partial order. All conditions are implicitly ANDed. Logically, each condition for the partial order is specified by a comparison operator (e.g., <) and an attribute over which the comparison condition is applied. It should be noted that SLAVE.Attr Op MASTER.Attr is a syntactic redundancy to make the query examples herein more readable. For the purposes of this description, MASTER and SLAVE are keywords and Op is restricted to any comparison operator that is transitive.

Figure 5:
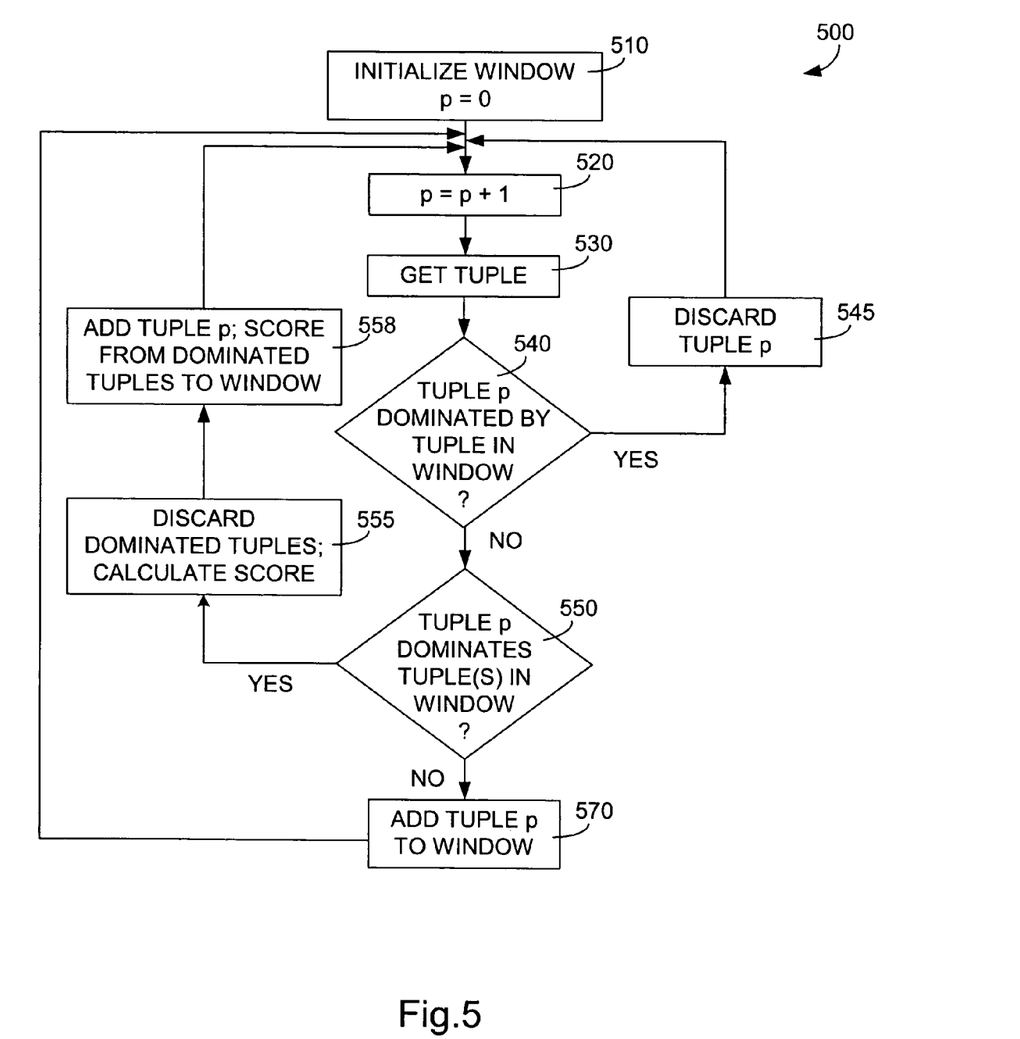
FIG. 5 is a flowchart outlining a method for implementing a dominance operator in accordance with an embodiment of the present invention.

Referring to FIG. 5, one method for implementation of the dominance operator 500 is shown. This implementation based on a block nested loop technique described in Borzonyi S, Kossmann K, and Stoker D The Skyline Operator. Proceedings of ICDE 2001. The interested reader is referred to this paper for alternative techniques that would be helpful in implementing the dominance primitive. In general, this algorithm keeps a window of incomparable "master" tuples in main memory. Each new tuple that is read is compared to the tuples in the window and either added to the window to replace dominated tuples or discarded as follows. At 510 a window for holding "master" tuples is initialized, as well as a counter p. At 520 and 530 a next tuple p is obtained. At 540 it is determined whether tuple p is dominated by any tuple in the window. If so, at 545 the tuple is discarded. If the tuple is not dominated by any tuple in the window but rather dominates one or more tuples in the window (550), the aggregate score of the dominated tuples is calculated and the dominated tuples are discarded at 555 and the tuple p is added to the window at 558. If the tuple p neither dominates nor is dominated by any tuple in the window, tuple p is added to the window at 570. At the end of each pass through the tuples, tuples in the window can be output as masters if they have been compared to all tuples (were present at the in the window before any tuples were discarded). Later added tuples can be output only at later passes through the tuples to ensure that they have been compared to all the tuples.

The REPRESENT clause allows specification of the representation primitive. In particular, it allows specification of the partitioning attributes, the objective function to be maximized or minimized, and the constraints the output must satisfy.

```
REPRESENT WITH (PARTITIONING BY <attr-list>)
    [MAXIMIZING|MINIMIZING] <aggr-expr>
        (GLOBAL CONSTRAINT <global-constraint>)*
        (FILTER CONSTRAINT <filter-constraint>)*
        (LOCAL CONSTRAINT <local-constraint>)*
```

The optional PARTITIONING BY specifies a set of attributes on which to partition the statements in the workload. It should be noted that LOCAL CONSTRAINTs are meant to be used only if PARTITIONING BY is specified.

<aggr-expr> is an aggregate expression of the form Aggregate(Attribute) that is to be maximized (or minimized) subject to specified constraints, and can be referred to as the optimization criterion. Aggregate can be the SUM or COUNT aggregate function.

<filter-constraint> is a condition of the form (Attr Op Expression). <global-constraint> and <local-constraint> are both conditions of theform (Aggregate(Attr) Op Expression). In all these constraints, Expression can involve constants, aggregates on an attribute computed over the entire set of statements in put to the representation primitive (obtained by prefixing the aggregate by the keyword GLBOAL), or aggregates computed over the set of tuples within a partition (obtain by prefixing the aggregate with the keyword (LOCAL). LOCAL can only be used in a filter or local constraint, and not in a global constraint.

The following examples illustrate several workload summarization tasks expressed as queries WAL. These examples highlight the expressiveness and usefulness of the primitives exposed in a declarative interface. The first three examples correspond to the three examples discussed above. For purposes of the examples, WorkladTable is the name of the table containing the workload statements according to the schema in FIG. 2.

EXAMPLE 1

The following sequence of commands prepares a workload for input to an index selection tool like the physical design tool 140 in FIG. 1.

```
SELECT*, DOMSUM(Weight) AS Dom_Weight
FROM WorkloadTable
DOMINATE WITH PARTITIONING BY
    FromTables, JoinConds, WhereCols
    SLAVE.GroupByCols SUBSET MASTER.GroupByCols
    SLAVE.OrderByCols PREFIX MASTER.OrderByCols
REPRESENT WITH PARTITIONING BY
    FromTables, JoinConds, WhereCols
MAXIMIZING Sum(DOM_Weight)
    GLOBAL CONSTRAINT Count(*) ≤ 200
    LOCAL CONSTRAINT Count(*) ≥
        int(200*LOCAL.Count(*)/GLOBAL.Count(*))
```

EXAMPLE 2

The following series of commands finds queries that are potential performance bottlenecks.

```
SELECT * FROM WorkloadTable
REPRESENT WITH
MINIMIZING COUNT(*)
GLOBAL CONSTRAINT SUM(CPUTime) > 0.50 *
GLOBAL.SUM(CPUTime)
GLOBAL CONSTRAINT SUM(IOTime) > 0.50 *
GLOBAL.SUM(IOTime)
```

GLOBAL CONSTRAINT SUM(Memory) >0.50* GLOBAL.SUM(Memory)

EXAMPLE 3

The following series of commands identifies columns for potential building or updating of statistics.

```
SELECT * FROM WorkloadTable
WHERE ABS(CardEst - CardActual)/CardActual > 0.5
  AND (ExecutionCost > 1.0)
DOMINATE WITH PARTITIONING BY FromTables, JoinConds
  SLAVE.SelectCols SUBSET MASTER.SelectCols
  SLAVE.WhereCols SUBSET MASTER.WhereCols
REPRESENT WITH PARTITIONING BY FromTables, JoinConds
MAXIMIZING SUM(CostRatio)
GLOBAL CONSTRAINT Count(*) ≤ 100
LOCAL CONSTRAINT Count(*) ≤ 5
```

EXAMPLE 4

The following series of commands obtains a summary of the workload for use in building samples of the database for approximate processing of aggregation queries. In this example, among all queries in each partition specified in the representation clause, at most 10 queries are requested. The total number of queries cannot exceed 500, while maximizing the total weight of all queries that are selected.

```
SELECT * FROM WorkloadTable
REPRESENT WITH PARTITIONING BY FromTables,
JoinConds, GroupByCols,
WhereCols
MAXIMIZING SUM(Weight)
    GLOBAL CONSTRAINT Count(*) ≤ 500
    LOCAL CONSTRAINT Count(*) ≤ 10
```

EXAMPLE 5

The following sequence of commands finds queries in each application with a low relative index usage. A subset is sought of at most 100 queries in the workload maximizing total execution cost suttee that, for each application, a subset of queries is selected that has a lower-than-average index usage despite having a higher-than-average number of tables references compared to other queries from the application.

```
SELECT * FROM WorkloadTable
REPRESENT WITH PARTITIONING BY Application
MAXIMIZING Sum(ExecutionCost)
GLOBAL CONSTRAINT COUNT(*) ≤ 1000
LOCAL CONSTRAINT AVG(NumIndexesUsed) < 0.75 *
LOCAL.AVG(NumIndexesUsed)
LOCAL CONSTRAINT AVG(NumTables) > 1.25 *
LOCAL.AVG(NumTables)
```

Although the dominance and representation primitives present in this description are described in the context of workload summarization, the applicability of these operators is not limited to workload summarization. The following examples illustrate other domains where these operators could be useful in complementing existing analysis techniques in the respective domains.

Scenario 1

A company mails product catalogs to its customers. The company has a fixed budget for mailing costs. The concept of dominance can help in the scenario as follows: to avoid sending multiple catalogs to a single address, the company considers all customers with the same address as equivalent, and will pick one customer at that address, for example, the person in the household with the highest income. To maximize the expected benefit from the mailing, the company may like to select a subset of customers with the largest total "importance", which could be measured by the amount of money spent in the past. Representation is useful for specifying such a subset while not exceeding the mailing-cost budget (a global constraint), and ensuring that one customer is picked from each address (a local constraint).

Scenario 2

Web pages are often personalized based on user profiles. When a user requests a web page, only a fixed number k of targeted ads can typically be displayed on that page. The concept of partitioning and local constraints can be useful to specify that at most two ads from each category (such as food, jewelry, books, etc.) should be chosen. Dominance can be useful in specifying whether, within a category (based on the user's profile), the expensive items or the inexpensive items should dominate. Representation is necessary since the company running the web site wishes to pick a subset of ads such that a certain objective function (e.g., the likelihood of click-throughs) is maximized, while not exceeding the global constraint of k ads.

Scenario 3

In a web community scenario an incoming question needs to be answered by locating a certain set of "experts" on the subject. The goal is to provide a timely response from as highly rated an expert as possible. For cost effectiveness, no more than n experts should be requested for any given question. Dominance can be useful to partition experts according to different time zones in order to improve the probability of providing a quick response. Within each zone, a person having a higher expertise rating and lower average response time as "dominating" any other expert with a lower rating and higher average response time. Representation can be useful for specifying that the subset of at most n experts is selected while the sum of expertise is maximized, subject to having at least one expert from each partition.

Figure 4:
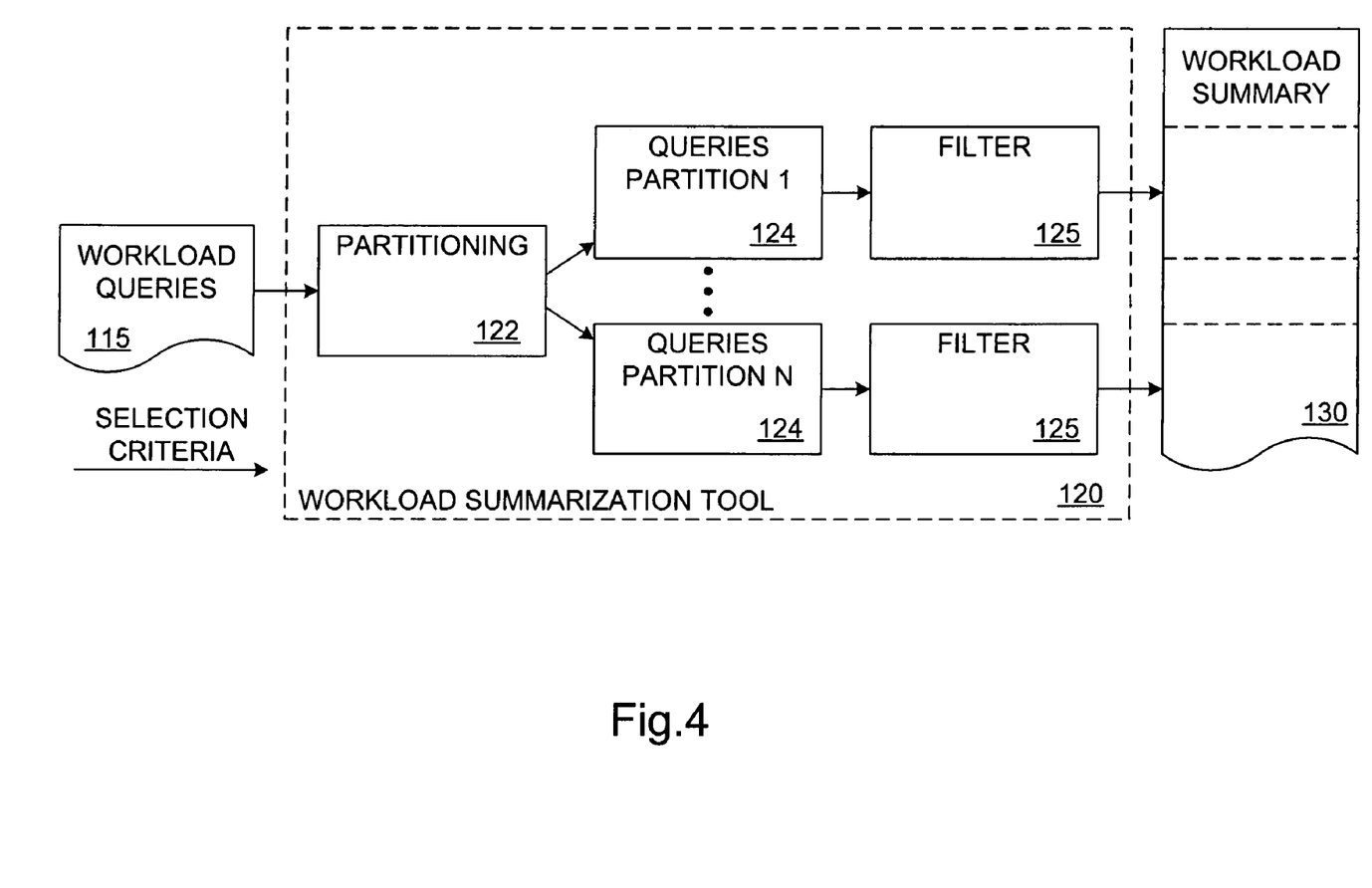
FIG. 4 is a functional block diagram of the workload summarization tool of FIG. 1.

The following description will detail a possible implementation of the primitives dominance and representation in SQL, assuming that the syntax for exposing dominance and representation is as described above. FIG. 4 gives a general overview of the workload summarization tool 120 that utilizes dominance and representation as part of a collection of operators to construct a workload summary 130 given a query workload 115 and some selection criteria.

A partitioning module 122 partitions the workload queries on a partitioning attribute that is part of the selection criteria. Partitioning is significant because both dominance and representation are specified with partitioning attributes. The partitioning of the input can be achieved either by hashing or by sort-based methods, which can exploit indexes or existing orders on the input. Once the input is partition, dominance and representation may need to be invoked within each partition 124. Techniques from group-wise processing can be leveraged for implementation of the dominance and special forms of representation. The result of the overall query is the union over the results of the sub-query over each partition, which is applied as a filter 125 on the queries in each partition.

The physical operator necessary for the dominance primitive is a generalization of the Skyline operator as discussed above in conjunction with FIG. 5. The specification of the attributes in the PARTITIONING BY induces a partitioning of the input. Thus the checking of dominance conditions is limited to tuples within a partition. The Skyline operator is implemented as above with the generalization that any transitive dominance condition can be specified. The addition of dominance-based aggregate attributes or "scores" for dominating tuples is not part of the Skyline operator and must be implemented separately.

In order to implement the representation operator inside a SQL engine to support the REPRESENT clause in it full generality requires the ability to implement solvers for the Integer Programming problem. Several such industrial strength solvers can provide exact of approximate answers to mathematical optimization problem. While incorporating such a solver into the SQL query engine may be possible and indeed useful for a class of applications, the resulting operator will be very expensive to execute, particularly on large data sets that are typical in today's databases. Thus, a less expensive representation physical operator that provides a user-guided search may be advantageous in some instances.

A user-guided search is efficient and accessible to developers. A simply greedy heuristic is used that examines one statement or tuple at a time in a single pass over the input. To achieve to user-guided search, the syntax of the REPREESNT clause is extended with an optional RANK-ING BY <Expression-List>. The full syntax of the extended REPRESENT clause is shown below.

```
REPRESENT WITH (PARTITIONING BY <attr-list>)
    [MAXIMIZING|MINIMIZING]<aggr-expr>
        (GLOBAL CONSTRAINT <global-constraint>)*
        (FILTER CONSTRAINT <filter-constraint>)*
        (LOCAL CONSTRAINT <local-constraint>)*
    (RANKING BY <Expression-List>)
```

Figure 6:
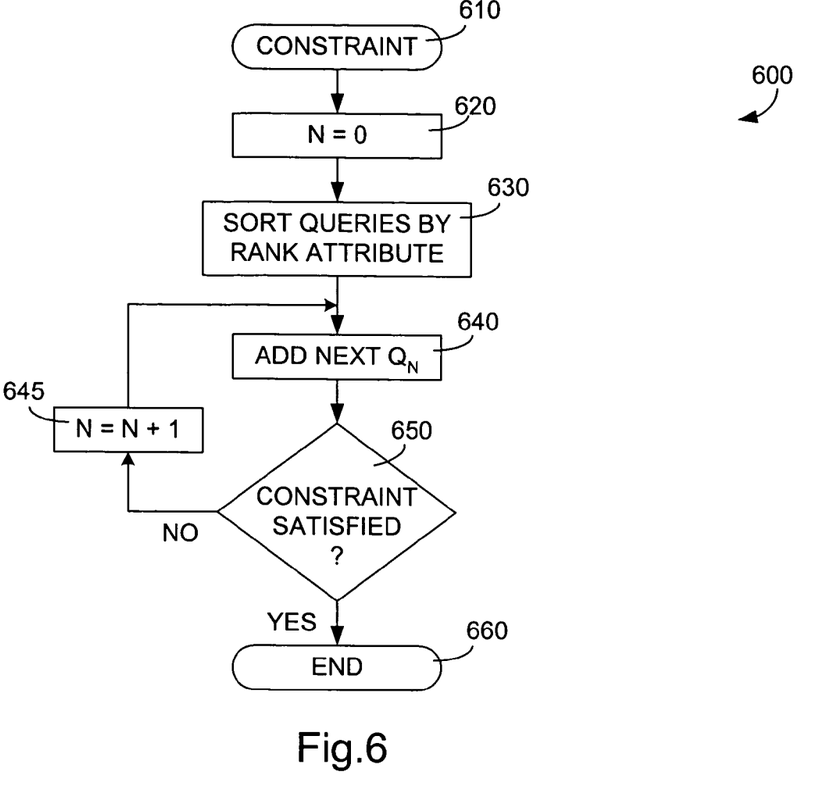
FIG. 6 is a flowchart outlining a method for implementing a representation operator in accordance with an embodiment of the present invention.

When the RANKING BY clause is specified, <aggr-expr> is limited to being COUNT(*). The RANKING BY specifies the order in which the input tuples should be accessed. FIG. 6 is a flowchart representation of a method 600 that can be used to implement representation with RANKING BY. At 610 the constraints and optimization function are input. A counter N is initiated at 620. At 630-645 the input tuples are scanned in the order specified by the <Expression-List> in RANKING BY. For example, RANKING BY (A+B) DESC means that the tuples must be considered for inclusion in the output in descending order of the expression (A+B) evaluated on each tuple. When the RANKING BY clause is not specified, the implementation for the general case of IP is invoked.

Despite the restriction of only allowing <aggr-expr> to be COUNT(*), it may be possible for the application developer to map a query that requires maximizing/minimizing a SUM(attr) aggregate to a query that only maximizes/minimizes COUNT(*) but using RANKING BY. While the two queries are not equivalent, the quality and performance trade-off may be acceptable for the application. For example, if SUM(Attr) is to be maximized subject to Count (*) $\leq$ k, this could be mapped e.g., to a maximizing COUNT (*) query with the constraint Count(*) $\leq$ k and RANKING BY Attr DESC.

The semantics of a query with RANKING BY can be procedurally described a follows. For the MINIMIZING case, before the input is scanned, all $\leq$ constraints are trivially satisfied. If the addition of the next tuple would violate any $\leq$ constraint (650), then the tuple is discarded. Otherwise, the tuple is added at 640 to the output. The method terminates as soon as all $\geq$ constraints are satisfied or the end of the input is reached at 650, 660. A final check is performed to see if all $\geq$ constraints are satisfied, and not, it is reported that a feasible solution was not found. The procedure for the MAXIMIZING case is identical except that the termination condition is only when the end of the input is reached. An alternative solution may be to use known algorithms for Top-K query processing.

RANKING BY provides a particular way to specify how the general mathematical optimization problem should be solved. Another such approach is uniform random sampling or stratified sampling. It is possible to expose stratified sampling by combining PARTITIONING BY with a local equality constraint on Count(*). Likewise uniform random sampling exposed using a single global equality constraint. In these cases an aggregate is not maximized or minimized, but rather a random subset with the specified count is found.

A specialized representation operator can be advantageous for a special class of queries. A query MAXIMIZING an aggregate over some attribute A subject to arbitrary filter constraints, together with a local constraint on Count(*), and a global constraint on Count(*) is proposed for consideration. Intuitively, such queries require selecting some set of tuples to maximize an objective, while being constrained by the total number of tuples to be selected, as well as having constraints on how these chosen tuples are distributed across the different partitions. There are many interesting queries that fall into this class, including for of the five example queries described above.

An efficient operator to solve this special case exactly is as follows. When both the global and local constraints are of the form Count(*)$\geq c_1$, the solution is trivially the entire input. When the global constraint is Count(*)$\geq c_1$ and the local constraint is Count(*)$\leq c_2$, the global constraint is ignored and within each partition tuples are added to the output in descending order of attribute A until no more tuples can be added without violating the constraint. This approach takes advantage of the group-wise processing operator as discussed earlier to repeatedly execute this operation within each partition. The global constraint is checked at the end. When the global constraint is Count(*)$\leq c_1$ and the local constraint is Count(*)$\geq c_2$, each local constraint is minimally satisfied separately, i.e., exactly $c_2$ tuples are selected from each partition in descending order of A. If the global constraint has already been violated, then no solution exists. Otherwise, the remaining tuples are picked form the input in descending order of A and added to the output as long as the global constraint is not violated. The final case when the global constraint is Count(*)$\leq c_1$ and the local constraint is Count(*)$\leq c_2$ ($c_2$ must be $\leq c_1$). In this case, the input is accessed in descending order of A and tuples are added as long as the local constraint of the partition is not violated. Tuples are no longer added when $c_1$ tuples have been added to the output of the end of input is reached.

Another class of queries for which optimal solutions can be implemented efficiently are queries that minimize Count (*). An exact solution can be obtained for the case when there are arbitrary filter conditions and at most one other constraint, either global or local. The input tuples are scanned in decreasing order of the attribute involved in the constraint, and are added to the output until the constraint is satisfied. If the constraint is a local constraint, the group-wise operator is used to execute this operation within each partition. Finally, when there are global and local constraints on the same attribute and in the same direction, an optimal solution can be similarly obtained.

When there are a multiple number c global/local constraints, all of which are c "$\geq$" constraints, the same ideas can be applied in a multi-pass fashion to achieve an approximate solution. The constraints are satisfied one by one. In the $i^{th}$ pass, tuples are scanned in descending order of the attribute in the $i^{th}$ constraint, and added to the output until that constraint is satisfied. Proceeding in this fashion until all the constraints are satisfied leads to a solution with an approximation ration of c, where c is the total number of constraints. An optimization that can lead to a better approximation ratio in practice is to perform the $i^{th}$ pass only over tuples that are not already in the output (and adjust the constraints to take into account the contribution from tuples that are already part of the output. Finally, it may be possible to get a better approximation ratio by ordering the constraints in an intelligent manner.

Exemplary Operating Environment

The query processing system 100 described above includes a workload summarization tool constructed in accordance with one exemplary embodiment of the invention. Most typically, the query processing system 100 is constructed in software executing on a computer system 20 (FIG. 9) such as a server computer which in turn is coupled to other servers or computers on a network. A computer system 20 that can serve as a server or query processing computer is depicted in FIG. 9 and described in greater detail below.

Figure 9:
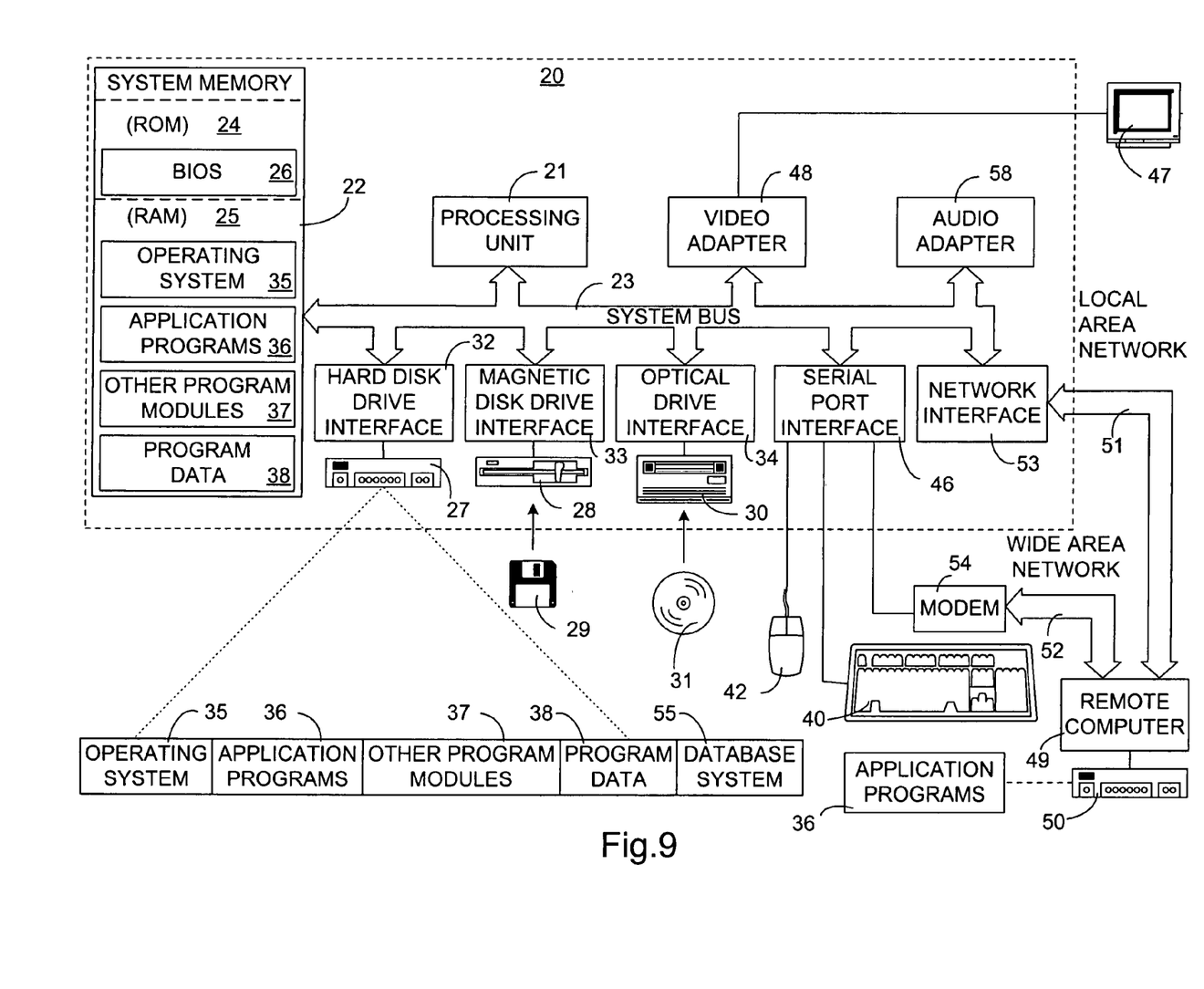
FIG. 9 is an exemplary operating environment for practicing an embodiment of the present invention.

FIG. 9 and the following discussion are intended to provide a brief, general description of a suitable computing environment in which the invention can be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 9, an exemplary system for implementing the invention includes a general purpose computing device in the form of a conventional personal computer 20, including a processing unit 21, a system memory 22, and a system bus 23 that couples various system components including system memory 22 to processing unit 21. System bus 23 may be any of several types of bus structures including a memory bus or memory controller, a peripheral bus, and a local bus using any of a variety of bus architectures. System memory 22 includes read only memory (ROM) 24 and random access memory (RAM) 25. A basic input/output system (BIOS) 26, containing the basic routines that help to transfer information between elements within personal computer 20, such as during start-up, is stored in ROM 24. Personal computer 20 further includes a hard disk drive 27 for reading from and writing to a hard disk, a magnetic disk drive 28 for reading from or writing to a removable magnetic disk 29 and an optical disc drive 30 for reading from or writing to a removable optical disc 31 such as a CD ROM or other optical media. Hard disk drive 27, magnetic disk drive 28, and optical disc drive 30 are connected to system bus 23 by a hard disk drive interface 32, a magnetic disk drive interface 33, and an optical drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disc 31, it should be appreciated by those skilled in the art that other types of computer-readable media which can store data that is accessible by computer, such as random access memories (RAMs), read only memories (ROMs), and the like may also be used in the exemplary operating environment.

A number of program modules may be stored on the hard disk, magnetic disk 129, optical disc 31, ROM 24 or RAM 25, including an operating system 35, one or more application programs 36, other program modules 37, and program data 38. A database system 55 may also be stored on the hard disk, magnetic disk 29, optical disc 31, ROM 24 or RAM 25. A user may enter commands and information into personal computer 20 through input devices such as a keyboard 40 and pointing device 42. Other input devices may include a microphone, stylus, joystick, game pad, satellite dish, scanner, or the like. These and other input devices are often connected to processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as a video adapter 48. In addition to the monitor, personal computers typically include other peripheral output devices such as speakers and printers.

Personal computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to personal computer 20, although only a memory storage device 50 has been illustrated in FIG. 9. The logical connections depicted in FIG. 9 include local area network (LAN) 51 and a wide area network (WAN) 52. Such networking environments are commonplace in offices, enterprise-wide computer networks, intranets, and the Internet.

When using a LAN networking environment, personal computer 20 is connected to local network 51 through a network interface or adapter 53. When used in a WAN networking environment, personal computer 20 typically includes a modem 54 or other means for establishing communication over a wide area network 52, such as the Internet. Modem 54, which may be internal or external, is connected to system bus 23 via serial port interface 46 or a broadband connection. In a networked environment, program modules depicted relative to personal computer 20, or portions thereof, may be stored in remote memory storage device 50. It will be appreciated that the network connections shown are exemplary and other means of establishing a communications link between the computers may be used.

It can be seen from the foregoing description that dominance and representation primitives can facilitate database object summarization, such as workload summarization. Although the present invention has been described with a degree of particularity, it is the intent that the invention include all modifications and alterations from the disclosed design falling within the spirit or scope of the appended claims.

We claim:

1. At least one computer-readable media having instructions stored thereon for generating a database operator that selects a subset of a plurality of database objects having associated attributes, the database operator comprising:
   a partial order specification module that receives a workload, the workload including a plurality of database objects, wherein the partial order specification module determines a first subset of database objects and a second subset of database objects in the plurality of database objects of the workload, the first subset of database objects comprising database objects that dominate at least one database object in the second subset of database objects; and
   a database object subset selection module that generates a summarized workload by:
      determining a third subset of database objects within the second subset of database objects that dominate at least one database object in the first subset of database objects;
      combining the first subset of database objects and the third subset of database objects to generate the summarized workload;
   outputting the summarized workload.

2. The computer-readable media of claim 1 wherein the database operator further comprises a partitioning module that partitions the database objects into partitions based on a partitioning attribute; wherein database objects in the partition have equivalent values for the partitioning attribute and wherein the subset selection module applies the partial order separately for each partition.

3. The computer-readable media of claim 1 wherein the database operator further comprises a dominance aggregation module that, for a master database object, aggregates information about slave database objects that the master database object dominates.

4. The computer-readable media of claim 3 wherein information about a slave database object is distributed between two master database objects that dominate the slave object.

5. The computer-readable media of claim 1 wherein the database objects are database statements from a database workload presented according to a workload schema.

6. The computer-readable media of claim 1 wherein when a database object in the second subset dominates the associated database object in the first subset, one of either the database object in the first subset or the database object in the second subset is eliminated from the corresponding subset.

7. The computer-readable media of claim 1 wherein the partial order specification module inputs a partial order criterion comprising a conjunction of one or more transitive inequality conditions.

8. The computer-readable media of claim 2 wherein the partitioning module hashes database objects on the partitioning attribute.

9. The computer-readable media of claim 1 wherein the plurality of database objects includes queries.

10. The computer-readable media of claim 9 wherein the first subset of database objects includes a first query associated with a first condition and a second condition and the second subset of database objects includes a second query associated with the first condition.

11. The computer-readable media of claim 10 wherein the second query is not associated with the second condition.

12. The computer-readable media of claim 1 wherein attributes of the database objects are associated with at least one partial order condition.

13. The computer-readable media of claim 12 wherein a partial order condition of a database object in the first plurality of database objects is a subset of a partial order condition of a database object in the second plurality of database objects.

14. The computer-readable media of claim 13 wherein the partial order condition of the database object in the first plurality of database objects and the database object in the second plurality of database objects include a grouping of attributes.

15. The computer-readable media of claim 14 wherein each of the attributes in the grouping of attributes of the database object in the second plurality of database objects is included in the grouping of attributes of the database object in the first plurality of database objects.

16. The computer-readable media of claim 15 wherein at least one attribute in the grouping of attributes of the database object in the first plurality of database objects is not included in the attributes in the grouping of attributes of database object in the second plurality of database objects.

17. The computer-readable media of claim 12 wherein a partial order condition of a database object in the first plurality of database objects is a prefix of a partial order condition of a database object in the second plurality of database objects.

18. The computer-readable media of claim 17 the partial order condition associated with the database object in the first plurality of database objects includes an ordering of statements based on attributes associated with the database object in the first plurality of database objects and the partial order condition associated with database object in the second plurality of database objects includes an ordering of statements based on attributes associated with the database object in the second plurality of database objects.

19. The computer-readable media of claim 17 wherein each of the partial order conditions includes an ordering of statements based on attributes associated with the corresponding database object.

20. The computer-readable media of claim 19 wherein each of the attributes associated with the database object in the second plurality of database objects is included in the attributes associated with the database object in the first plurality of database objects.

21. The computer-readable media of claim 20 wherein at least one attribute associated with the database object in the first plurality of database objects is not included in the attributes associated with the database object in the second plurality of database objects.

22. A method that selects a subset of database objects from a plurality of database objects having associated attributes comprising:
    accessing two or more database objects from the plurality of database objects, wherein the database objects comprise database statements from a database workload;
    inputting a partial order criterion for at least one attribute associated with the two or more database objects;
    applying the partial order criteria to the two or more database objects to identify at least one master database object, the at least one master database object dominating at least one other database object in the plurality of database objects;
    identifying a subset of master database objects that are dominated by at least one other database object in the plurality of database objects;
    generating a subset of database objects including the identified master database objects dominating at least one other database object in the plurality of database objects minus the subset of master database objects that are dominated by at least one other database object in the plurality of database objects; and
    outputting the generated subset of database objects.

23. The method of claim 22 comprising partitioning the plurality of database objects into partitions based on a partitioning attribute such that database objects in the partition have equivalent values for the partitioning attribute and wherein the partial order criteria is applied separately to database objects in each partition.

24. The method of claim 22 comprising aggregating information about slave database objects that are dominated by an associated master database object and are not included in the subset.

25. The method of claim 22 comprising selecting one of two database objects for inclusion in the subset if each of the two database objects dominates the other.

26. The method of claim 23 comprising hashing the database objects on the partitioning attribute.

27. One or more computer-readable media comprising computer executable instructions for performing the method of claim 22.

28. The method of claim 22 wherein the step of applying comprises:
    identifying the at least one master database object based on a condition based on attributes of the at least one master database object; and
    identifying the at least one other database object in the plurality of database objects, wherein the at least one other database object in the plurality of database objects includes a condition based on at least one attribute.

29. The method of claim 28 wherein the condition associated with the at least one master database object comprises a subset of the condition associated with the at least one other database object in the plurality of database objects.

30. The method of claim 28 wherein each of the at least one attributes associated with the condition of the at least one other database object is included in the attributes of the at least one master database object.

31. The method of claim 30 wherein at least one attribute of the at least one master database object is not included in the at least one attribute associated with the condition of the at least one other database object.

32. The method of claim 28 wherein the condition associated with the at least one master database object is a prefix of the condition associated with the at least one other database object in the plurality of database objects.

33. The method of claim 31 wherein the condition includes an ordering of the database objects.

34. The method of claim 33 wherein ordering of the master database object is based on a first plurality of attributes and ordering of the at least one other database object is based on at least one attribute.

35. The method of claim 33 wherein a subset of the plurality of attributes of the master database object includes each of the at least one attribute of the at least one other database object in the plurality of database objects.

36. The method of claim 35 wherein at least one attribute in the plurality of attributes of the master database object is not included in the at least one attribute of the at least one other database object in the plurality of database objects.

37. One or more computer readable media having computer-executable instructions stored thereon for selecting a subset of a plurality of database objects having associated attributes, the instructions comprising:
    inputting a partial order criterion for an attribute to determine a master database object in the plurality of database objects that dominates at least one aassociated slave database object in the plurality of database objects, wherein the database objects comprise database statements from a database workload; and
    applying the partial order criterion to the database object attributes to identify a first subset of database objects and a second subset of database objects in the plurality of database objects, the first subset including master database objects and the second subset including associated slave database objects;
    eliminating all slave database objects that do not dominate their associated master database object from the second subset to obtain a modified second subset of database objects;
    generating a third subset of the plurality of database objects including the first subset of database objects and the modified second subset of database objects; and
    outputting the third subset of the plurality of database objects.

38. The computer readable media of claim 37 wherein the instructions comprise partitioning the database objects into partitions based on a partitioning attribute; wherein database objects in the partition have equivalent values for the partitioning attribute and wherein the filtering module applies the partial order separately for each partition.

39. The computer readable media of claim 37 wherein the instructions comprise aggregating information about slave database objects that the master database object dominates.

40. The computer readable media of claim 39 wherein the information about a slave database object is distributed between two master database objects that dominate the slave object.

41. The computer readable media of claim 37 wherein the database objects are database statements from a database workload presented according to a workload schema.

42. The computer readable media of claim 37 wherein when a slave database object dominates the associated master database object, one of either the slave or master database objects is eliminated from the subset.

43. The computer readable media of claim 37 wherein the partial order criterion comprises a conjunction of one or more transitive inequality conditions.

44. The computer readable media of claim 38 wherein the instructions comprise hashing the database objects on the partitioning attribute.

45. The computer readable media of claim 37 wherein the step of applying comprises:
    identifying the at least one master database object based on a condition based on attributes of the at least one master database object; and
    identifying the at least one associated slave database object in the plurality of database objects, wherein the at least one associated slave database object in the plurality of database objects includes a condition based on at least one attribute.

46. The method of claim 45 wherein the condition associated with the at least one master database object comprises a subset of the condition associated with the at least one associated slave database object in the plurality of database objects.

47. The method of claim 45 wherein the condition associated with the at least one master database object is a prefix of the condition associated with the at least one associated slave database object in the plurality of database objects.

48. The method of claim 45 wherein each of the at least one attributes associated with the condition of the at least one associated slave database object is included in the attributes of the at least one master database object.

49. The method of claim 48 wherein at least one attribute of the at least one master database object is not included in the at least one attribute associated with the condition of the at least one associated slave database object.

50. The method of claim 49 wherein the condition includes an ordering of the database objects.

51. The method of claim 50 wherein ordering of the master database object is based on a first plurality of attributes and ordering of the at least one associated slave database object is based on at least one attribute.

52. The method of claim 50 wherein a subset of the plurality of attributes of the master database object includes each of the at least one attribute of the at least one associated slave database object in the plurality of database objects.

53. The method of claim 52 wherein at least one attribute in the plurality of attributes of the master database object is not included in the at least one attribute of the at least one associated slave database object in the plurality of database objects.

54. An apparatus for selecting a subset of database objects from a plurality of database objects having associated attributes comprising:
    at least one processor;
    a component for accessing two or more database objects from the plurality of database objects;
    a component for inputting a partial order criterion for at least one attribute associated with the two or more database objects;
    a component for applying the partial order criteria to the two or more database objects to identify at least one master database object, the at least one master database object dominating at least one other database object in the plurality of database objects, wherein the database objects comprise database statements from a database workload;
    a component for identifying a subset of master database objects that are dominated by at least one other database object in the plurality of database objects;
    a component for generating a subset of database objects including the identified master database objects dominating at least one other database object in the plurality of database objects minus the subset of master database objects that are dominated by at least one other database object in the plurality of database objects; and
    a component for outputting the generated subset of database objects.

55. The apparatus of claim 54 comprising a component for partitioning the plurality of database objects into partitions based on a partitioning attribute such that database objects in the partition have equivalent values for the partitioning attribute and wherein the means for applying the partial order criteria applies the criteria separately to database objects in each partition.

56. The apparatus of claim 54 comprising a component for aggregating information about slave database objects that are dominated by an associated master database object and are not included in the subset.

57. The apparatus of claim 54 comprising a component for selecting one of two database objects for inclusion in the subset if each of the two database objects dominates the other.

58. The apparatus of claim 55 comprising a component for hashing the database objects on the partitioning attribute.

59. The apparatus of claim 54 wherein the component for applying further identifies the at least one master database object based on a condition based on attributes of the at least one master database object and identifies the at least one associated slave database object in the plurality of database objects, and wherein the at least one associated slave database object in the plurality of database objects includes a condition based on at least one attribute.

60. The apparatus of claim 59 wherein the condition associated with the at least one master database object comprises a subset of the condition associated with the at least one associated slave database object in the plurality of database objects.

61. The apparatus of claim 59 wherein the condition associated with the at least one master database object is a prefix of the condition associated with the at least one associated slave database object in the plurality of database objects.

62. The apparatus of claim 59 wherein each of the at least one attribute associated with the condition of the at least one associated slave database object is included in the attributes of the at least one master database object.

63. The apparatus of claim 62 wherein at least one attribute of the at least one master database object is not included in the at least one attribute associated with the condition of the at least one associated slave database object.

64. The apparatus of claim 63 wherein the condition includes an ordering of the database objects.

65. The apparatus of claim 64 wherein ordering of the master database object is based on a first plurality of attributes and ordering of the at least one associated slave database object is based on at least one attribute.

66. The apparatus of claim 64 wherein a subset of the plurality of attributes of the master database object includes each of the at least one attribute of the at least one associated slave database object in the plurality of database objects.

67. The apparatus of claim 66 wherein at least one attribute in the plurality of attributes of the master database object is not included in the at least one attribute of the at least one associated slave database object in the plurality of database objects.

* * * * *